(12) United States Patent
Park et al.

(10) Patent No.: US 11,297,237 B2
(45) Date of Patent: Apr. 5, 2022

(54) ELECTRONIC DEVICE FOR AUTO FOCUSING FUNCTION AND OPERATING METHOD THEREOF

(71) Applicant: Samsung Electronics Co., Ltd., Gyeonggi-do (KR)

(72) Inventors: Kyongtae Park, Gyeonggi-do (KR); Jeongki Kim, Gyeonggi-do (KR); Kyunghoon Yoon, Gyeonggi-do (KR); Junsik Choi, Gyeonggi-do (KR); Hyungok Choi, Gyeonggi-do (KR)

(73) Assignee: Samsung Electronics Co., Ltd

( * ) Notice: Subject to any disclaimer, the term of this patent is extended or adjusted under 35 U.S.C. 154(b) by 0 days.

(21) Appl. No.: 16/821,359

(22) Filed: Mar. 17, 2020

(65) Prior Publication Data
US 2020/0304717 A1 Sep. 24, 2020

(30) Foreign Application Priority Data
Mar. 18, 2019 (KR) .......................... 10-2019-0030396

(51) Int. Cl.
*H04N 5/225* (2006.01)
*H04N 5/232* (2006.01)

(52) U.S. Cl.
CPC ..... *H04N 5/23287* (2013.01); *H04N 5/23254* (2013.01); *H04N 5/232127* (2018.08)

(58) Field of Classification Search
None
See application file for complete search history.

(56) References Cited

U.S. PATENT DOCUMENTS

| 8,422,878 | B2 | 4/2013 | Park et al. |
| 9,146,446 | B2 | 9/2015 | Kim et al. |
| 10,491,800 | B2 | 11/2019 | Shintani et al. |
| 10,516,820 | B2 | 12/2019 | Yoon et al. |
| 2003/0223007 | A1* | 12/2003 | Takane ............... H04N 5/232 348/335 |
| 2006/0055814 | A1* | 3/2006 | Okawa ............ H04N 5/23212 348/346 |

(Continued)

FOREIGN PATENT DOCUMENTS

| JP | 2003-032521 | 1/2003 |
| JP | 2003-322788 | 11/2003 |

(Continued)

OTHER PUBLICATIONS

International Search Report dated Jun. 26, 2020 issued in counterpart application No. PCT/KR2020/003651, 7 pages.

*Primary Examiner* — Jason A Flohre
*Assistant Examiner* — Dwight C Tejano
(74) *Attorney, Agent, or Firm* — The Farrell Law Firm, P.C.

(57) ABSTRACT

A method and an apparatus for operating an electronic device is provided. A first image is obtained at a first position of a focus lens of a camera module of the electronic device. The first image is output through a display. A second image is obtained at a second position of the focus lens while the first image is being output. A defocus amount of the focus lens at the second position is calculated based on the first image and the second image. An on-focus region is detected based on the calculated defocus amount.

18 Claims, 14 Drawing Sheets

(56) References Cited

U.S. PATENT DOCUMENTS

| | | | | |
|---|---|---|---|---|
| 2007/0116382 A1* | 5/2007 | Gotanda | ............... | H04N 5/238 |
| | | | | 382/293 |
| 2008/0218613 A1* | 9/2008 | Janson | ............... | H04N 5/23267 |
| | | | | 348/262 |
| 2009/0091633 A1* | 4/2009 | Tamaru | ............... | H04N 5/23218 |
| | | | | 348/208.14 |
| 2011/0128432 A1* | 6/2011 | Shiohara | ............ | H04N 5/23293 |
| | | | | 348/333.02 |
| 2014/0184879 A1* | 7/2014 | Kim | ................... | H04N 5/23293 |
| | | | | 348/341 |
| 2017/0295315 A1* | 10/2017 | Chang | ................ | H04N 5/23212 |
| 2019/0149739 A1* | 5/2019 | Sugita | ................... | G02B 7/282 |
| | | | | 348/240.99 |
| 2019/0222742 A1* | 7/2019 | Kim | ................... | H04N 5/23293 |

FOREIGN PATENT DOCUMENTS

| | | |
|---|---|---|
| JP | 2004-023580 | 1/2004 |
| JP | 2017228913 | 12/2017 |
| KR | 1020060039944 | 5/2006 |
| KR | 1020070053595 | 5/2007 |

* cited by examiner

ELECTRONIC DEVICE FOR AUTO FOCUSING FUNCTION AND OPERATING METHOD THEREOF

PRIORITY

This application is based on and claims priority under 35 U.S.C. § 119(a) to Korean Patent Application No. 10-2019-0030396, filed on Mar. 18, 2019, in the Korean Intellectual Property Office, the entire disclosure of which is incorporated herein by reference.

BACKGROUND

1) Field

The disclosure relates an electronic device having an auto focusing function and, more particularly, to an electronic device capable of removing wobbling that occurs while an auto focusing function is performed, and an operating method thereof.

2) Description of Related Art

Electronic devices are typically mounted with a camera, such as, for example, a digital camera, a digital camcorder, or a smartphone. These electronic devices equipped with a camera can provide a photographing function. For example, an electronic device can output a preview image on a display using an image obtained in real-time from a camera, and then can acquire an image taken by the camera when receiving an input for photographing.

Further, electronic devices provide an auto focusing function that automatically adjusts a focus on an object.

In general, an auto focusing function adjusts the focus on an object by moving a lens included in a camera back and forth, and an electronic device can output an image received through the camera while the auto focusing function is performed, as a preview image or a live view, through a display. However, the field of view of an image that is output on the display may shake (e.g., wobble) due to frequent movement of a focus lens while the auto focusing function is performed.

SUMMARY

Accordingly, embodiments of the disclosure provide an electronic device for performing auto focusing without shaking of an image in the electronic device, and a method of operating the electronic device.

According to an embodiment, an electronic device is provided that includes a camera module including a focus lens, a display, and a processor. The processor is configured to control the camera module to obtain a first image at a first position of the focus lens, and control the display to output the first image. The processor is also configured to control the camera module to obtain a second image at a second position of the focus lens while the first image is being output, and calculate a defocus amount of the focus lens at the second position based on the first image and the second image. The processor is further configured to detect an on-focus region on the basis of the calculated defocus amount.

According to an embodiment, a method of operating an electronic device is provided. A first image is obtained at a first position of a focus lens of a camera module of the electronic device. The first image is output through a display. A second image is obtained at a second position of the focus lens while the first image is being output. A defocus amount of the focus lens at the second position is calculated based on the first image and the second image. An on-focus region is detected based on the calculated defocus amount.

BRIEF DESCRIPTION OF THE DRAWINGS

The above and other aspects, features, and advantages of certain embodiments of the disclosure will be more apparent from the following detailed description when taken in conjunction with the accompanying drawings, in which.

DETAILED DESCRIPTION

Figure 1:
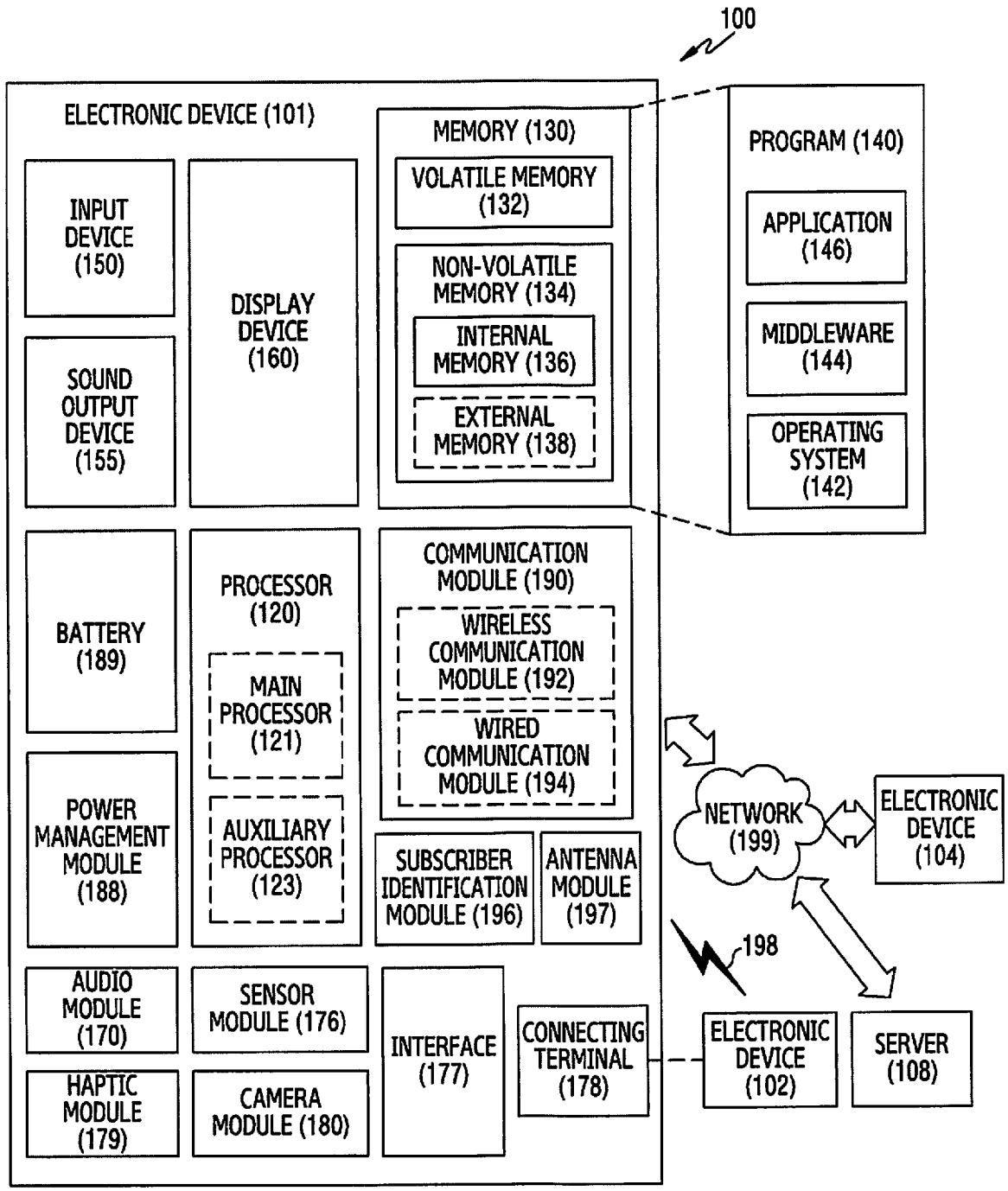
FIG. 1 is a block diagram illustrating an electronic device in a network environment, according to an embodiment.

Embodiments of the disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the disclosure. Further, the following terminologies are defined in consideration of the functions in the disclosure and may be construed in different ways by the intention or practice of users and operators. Therefore, the definitions thereof should be construed based on the contents herein.

FIG. 1 is a block diagram illustrating an electronic device in a network environment, according to an embodiment.

Referring to FIG. 1, an electronic device 101 in a network environment 100 may communicate with an electronic device 102 via a first network 198 (e.g., a short-range wireless communication network), or an electronic device 104 or a server 108 via a second network 199 (e.g., a long-range wireless communication network). The electronic device 101 may communicate with the electronic device 104 via the server 108. The electronic device 101 includes a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, and an antenna module 197. In some embodiments, at least one (e.g., the display device 160 or the camera module 180) of the components may be omitted from the electronic device 101, or one or more other components may be added in the electronic device 101. Alternatively, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may load a command or data received from another component (e.g., the sensor module 176 or the communication module 190) in a volatile memory 132, process the command or the data stored in the volatile memory 132, and store resulting data in a non-volatile memory 134. The processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 includes the volatile memory 132 and the non-volatile memory 134.

The program 140 may be stored in the memory 130 as software, and includes, for example, an operating system (OS) 142, middleware 144, and an application 146.

The input device 150 may receive a command or data to be used by another component (e.g., the processor 120) of the electronic device 101, from the outside (e.g., a user) of the electronic device 101. The input device 150 may include, for example, a microphone, a mouse, a keyboard, or a digital pen (e.g., a stylus pen).

The sound output device 155 may output sound signals to the outside of the electronic device 101. The sound output device 155 may include, for example, a speaker or a receiver. The speaker may be used for general purposes, such as, for example, playing multimedia or playing record, and the receiver may be used for incoming calls. The receiver may be implemented as separate from, or as part of the speaker.

The display device 160 may visually provide information to the outside (e.g., a user) of the electronic device 101. The display device 160 may include, for example, a display, a hologram device, or a projector, and control circuitry to control a corresponding one of the display, hologram device, and projector. The display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. The audio module 170 may obtain the sound via the input device 150, or output the sound via the sound output device 155 or a headphone of an external electronic device (e.g., the electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. The sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. The interface 177 may include a high definition multimedia interface (HDMI), a universal serial bus (USB) interface, a secure digital (SD) card interface, or an audio interface.

A connecting terminal 178 may include a connector through which the electronic device 101 may be physically connected with the external electronic device (e.g., the electronic device 102). The connecting terminal 178 may include an HDMI connector, a USB connector, an SD card connector, or an audio connector (e.g., a headphone connector).

The haptic module 179 may convert an electrical signal into a mechanical stimulus (e.g., a vibration or a movement) or electrical stimulus that may be recognized by a user via his tactile sensation or kinesthetic sensation. The haptic module 179 may include, for example, a motor, a piezoelectric element, or an electric stimulator.

The camera module 180 may capture a still image or moving images. The camera module 180 may include one or more lenses, image sensors, image signal processors, or flashes.

The power management module 188 may manage power supplied to the electronic device 101. The power management module 188 may be implemented as at least part of a power management integrated circuit (PMIC).

The battery 189 may supply power to at least one component of the electronic device 101. The battery 189 may include a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. The communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN))). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device 102) of the electronic device 101. The antenna module 197 may include an antenna including a radiating element composed of a conductive material or a conductive pattern formed in or on a substrate (e.g., PCB). The antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. Another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

Commands or data may be transmitted or received between the electronic device 101 and the external electronic device 104 via the server 108 coupled with the second network 199. Each of the external electronic devices 102 and 104 may be a device of a same type as, or a different type from, the electronic device 101. All or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
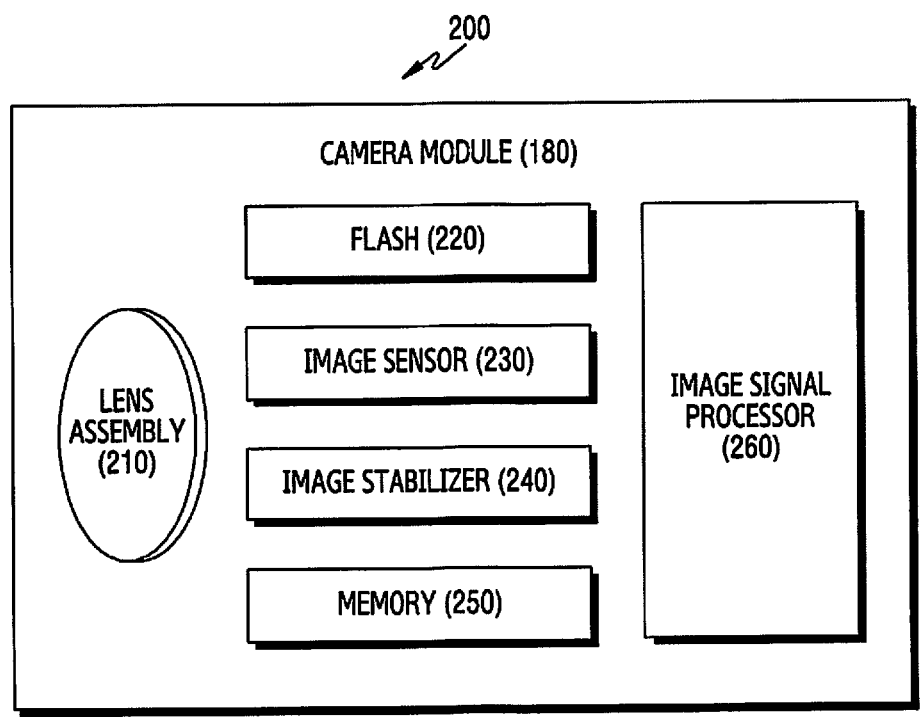
FIG. 2 is a block diagram illustrating an example of a camera module, according to an embodiment.

FIG. 2 is a block diagram illustrating a camera module, according to an embodiment.

Referring to a block diagram 200 of FIG. 2, the camera module 180 of FIG. 1 includes a lens assembly 210, a flash 220, an image sensor 230, an image stabilizer 240, memory 250 (e.g., buffer memory), and an image signal processor 260. The lens assembly 210 may collect light emitted or reflected from an object whose image is to be taken. The lens assembly 210 may include one or more lenses. The camera module 180 may include a plurality of lens assemblies 210. The camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include a wide-angle lens or a telephoto lens.

The flash 220 may emit light that is used to reinforce light reflected from an object. The flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. The image sensor 230 may include one selected from image sensors having different attributes, such as, for example, a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. The image stabilizer 240 may sense such a movement by the camera module 180 or the electronic device 101 using a gyro sensor or an acceleration sensor disposed inside or outside the camera module 180. The image stabilizer 240 may be implemented, for example, as an optical image stabilizer.

The memory 250 may store, at least temporarily, at least part of an image obtained via the image sensor 230 for a subsequent image processing task. If image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 160. Thereafter, if a specified condition is met (e.g., by a user's input or system command), at least part of the raw image stored in the memory 250 may be obtained and processed, for example, by the image signal processor 260. The memory 250 may be configured as at least part of the memory 130 or as a separate memory that is operated independently from the memory 130.

The image signal processor 260 may perform one or more image processing with respect to an image obtained via the image sensor 230 or an image stored in the memory 250. The one or more image processing may include depth map generation, three-dimensional (3D) modeling, panorama generation, feature point extraction, image synthesizing, and/or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display device 160, the electronic device 102, the electronic device 104, or the server 108) outside the camera module 180. The image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 160 as it is or after being further processed.

The electronic device 101 may include a plurality of camera modules 180 having different attributes or functions. At least one of the plurality of camera modules 180 may form a wide-angle camera and at least another of the plurality of camera modules 180 may form a telephoto camera. Similarly, at least one of the plurality of camera modules 180 may form a front camera and at least another of the plurality of camera modules 180 may form a rear camera.

Figure 3:
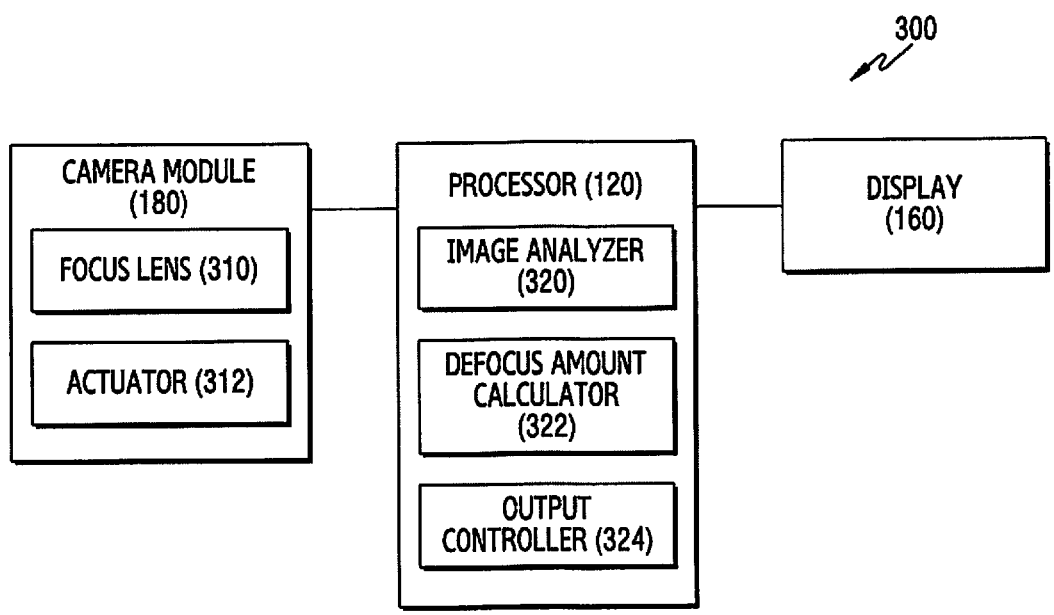
FIG. 3 is a diagram illustrating an auto focusing operation of an electronic device, according to an embodiment.

FIG. 3 is diagram illustrating an auto focusing operation of an electronic device, according to an embodiment.

Referring to FIG. 3, the electronic device includes a camera module 180, a processor 120, and a display 160.

According to an embodiment, the camera module 180 includes a focus lens 310 and an actuator 312.

The focus lens 312 can collect light emitted from an object that is the target for taking images. According to an embodiment, it is possible to adjust the focus of a lens assembly (e.g., the lens assembly 210 of FIG. 2) by adjusting the position of the focus lens 310. For example, the focus lens 310 can be moved to an on-focus region.

The actuator 312 can drive the focus lens 310. The actuator 312 can move the focus lens 410 to the on-focus region such that an on-focus state is entered. The actuator 312 may include a servo motor or an ultrasonic motor and may be referred as an auto focusing motor, etc. However, this is only an example and embodiments are not limited thereto. The actuator 312 may be implemented by various auto focusing motors that can move the focus lens 312 to the on-focus region.

The processor 120 includes an image analyzer 320, a defocus amount calculator 322, and an output controller 324.

The processor 120 can generate an on-focus image by performing the auto focusing function. The on-focus image may be an image focused on an object. The auto focusing function may include a search position determination operation and an on-focus region detection operation. The search position determination operation may be an operation that determines a start position of the on-focus region detection operation. The on-focus region detection operation may be an operation that moves the focus lens 310 step by step to the on-focus region based on a search position. The search position determination operation and the on-focus region detection operation may be referred to by various names.

The processor 120 can perform the search position determination operation using various techniques known in the art. The processor 120 can determine a search position based on a defocus amount of the focus lens 310. The defocus amount may be a value that shows the degree of departure from the on-focus region of the focus lens 310. For example, the image analyzer 320 of the processor 120 can calculate a focus signal value by performing frequency analysis on at least a portion of a first image and at least a portion of a second image, in which the first image and the second image have different focuses. The defocus amount calculator 322 of the processor 120 can calculate a defocus amount based on the focus signal value. The focus signal value may be associated with a blur image between the first image (or a portion of the first image) and the second image (or a portion of the second image). However, this is only an example and embodiments are not limited thereto. The processor 120 may use a contrast between the first image and the second image, or a phase difference between the first image and the second image, as the focus signal value.

When a defocus amount of the focus lens 310 is calculated, the processor 120 can estimate an approximate position of the on-focus region based on the defocus amount, and can determine the movement direction and movement amount of the focus lens 310 based on the approximate position. For example, when the focus lens 310 departs from the on-focus region over a reference range, the processor 120 can determine a position spaced apart from the current position of the focus lens 310 by a first distance toward the focus region, as a search position. As another example, when the focus lens 310 does not depart from the on-focus region over the reference range, the processor 120 can determine a position spaced apart from the current position of the focus lens 310 by a second distance shorter than the first distance toward the focus region, as a search position. Although the movement direction and position of the focus lens 310 are changed based on a defocus amount in FIG. 3, this is only an example and embodiments are not limited thereto. The processor 120 can adjust the movement speed of the focus lens 310 based on the defocus amount. For example, when the focus lens 310 departs from the on-focus region over the reference range, the processor 120 can move the focus lens 310 at a first speed to the search position. As another example, when the focus lens 310 does not depart from the on-focus region over the reference range, the processor 120 can move the focus lens 310 at a second speed, lower than the first speed, to the search position.

The processor 120 can limit output of the second image while determining a search position. The output controller 324 of the processor 120 can process a first image obtained with the focus lens 310 at a first position to be output through the display 160 while a search position is determined. For example, the output controller 324 can output the first image instead of a second image, even though the focus lens 310 at the first position is moved away from the on-focus region toward a second position in the opposite direction. Accordingly, it is possible to prevent an image of which the magnification is changed by a position change of the focus lens 310, and it is possible to provide an effect that removes wobbling in which an image that is output through the display 160.

When finishing the search position determination operation, the processor 120 can detect the on-focus region based on the determined search position. The processor 120 can determine whether the focus lens 310 has approached the on-focus region while moving the focus lens 310, step by step, from the second position. For example, the processor 120 can analyze a focus signal value (e.g., a contrast value) of an image that is obtained at the position to which the focus lens 310 has moved, and can determine that the focus lens has approached the on-focus region when a maximum focus signal value is measured.

The processor 120 may output an image obtained in the search position determination operation when performing the on-focus region detection operation. The output controller 324 of the processor 120 can process a second image obtained at the second position to be output through the display 160 while the focus lens 310 is moved from the second position to a third position that is a search position. Accordingly, as will be described below with reference to FIGS. 9, 10A to 10C, and 11, it is possible to reduce a change in magnification of an image that a user actually perceives.

The configuration in which the auto focusing function is performed by the processor 120 separated from the camera module 180 is described above. However, this is only an example and embodiments are not limited thereto. The auto focusing function of an electronic device may be performed by a processor (e.g., the image signal processor 260 of FIG. 2) included in the camera module 180.

An electronic device, according to an embodiment of the disclosure, includes a camera module including a focus lens, a display, and a processor. The processor is configured to control the camera module to obtain a first image at a first position of the focus lens, control the display to output the first image, control the camera module to obtain a second image at a second position of the focus lens while the first image is being output, calculate a defocus amount of the focus lens at the second position based on the first image and the second image, and detect an on-focus region based on the calculated defocus amount.

The processor is further configured to control the display such that an output of the second image is limited until the defocus amount is calculated.

The processor is further configured to control the camera module to obtain a third image at a third position of the focus lens, and control the display to replace the first image with the third image based on the defocus amount.

The processor is further configured to control the display to output the second image before the first image is replaced with the third image.

When the second position exists in a first direction in proximity to the on-focus region with respect to the first position, the processor is further configured to control the display to output the second image before the first image is replaced with the third image.

When the focus lens is moved over a reference distance from the second position in the first direction, the processor is further configured to control the display to output the second image before the first image is replaced with the third image.

When the focus lens is moved less than reference distance from the second position in the first direction, the processor is further configured to control the display to continue outputting the first image before the first image is replaced with the third image.

When the second position exists in a second direction that moves away from the on-focus region with respect to the first position, the processor is further configured to control the display to continue outputting the first image before the first image is replaced with the third image.

The processor is further configured to detect the on-focus region based on the contrast of the third image.

The processor is further configured to calculate the defocus amount based on a blur between the first image and the second image.

Figure 4:
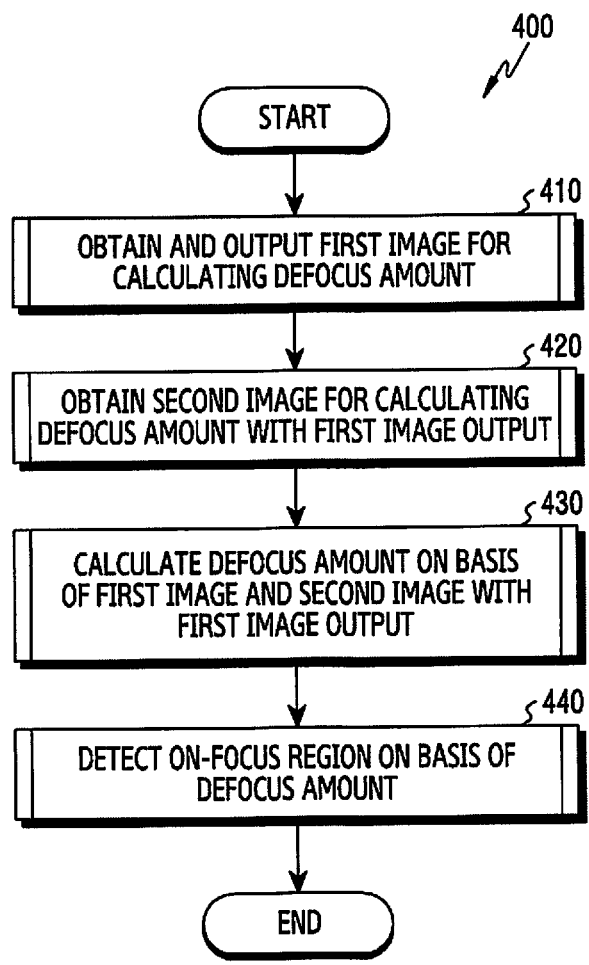
FIG. 4 is a flowchart illustrating a method for providing an auto focusing operation in an electronic device, according to an embodiment.

FIG. 4 is a flowchart illustrating a method for providing an auto focusing operation in an electronic device, according to an embodiment. The operations in the embodiments described below may be sequentially performed, but are not necessarily sequentially performed. For example, the orders of the operations may be changed and at least two operations may be performed in parallel.

Referring a flowchart 400 of FIG. 4, an electronic device 300 obtains a first image for calculating a defocus amount and outputs the obtained first image on the display 160, in operation 410. The first image may be an image obtained with a focus lens (e.g., the focus lens 310 of FIG. 3) at a first position. The processor 120 can control a camera module to obtain the first image.

The electronic device 300 obtains a second image for calculating a defocus amount, in operation 420. The second image may be an image obtained with the focus lens 310 moved to a second position from the first position. For example, the processor 120 can obtain the second image of which the image magnification has increased or decreased in comparison to the first image due to a position change of the focus lens 310 by controlling the camera module. The processor 120 can obtain a second image with the first image output on the display 106. For example, the processor 120 can limit output of the obtained second image, as described in greater detail below with reference to FIG. 5B.

The electronic device 300 calculates a defocus amount of the focus lens 310 based on the first image and the second image, in operation 430. As described above with reference to FIG. 3, the defocus amount may be a value showing the current degree of departure from the on-focus region of the focus lens 310. The processor 120 can calculate a defocus amount with the first image output. For example, the processor 120 can process the first image to be output on the display 106 instead of the second image before the defocus amount of the focus lens 310 is calculated.

The electronic device 300 performs the operation of detecting an on-focus region based on the calculated defocus amount, in operation 440. For example, the processor 120 can determine the position where the operation of detecting an on-focus region is started based on the defocus amount. Further, the processor 120 can move the focus lens 310, step by step, to the on-focus region based on the determined start position.

Figure 5A:
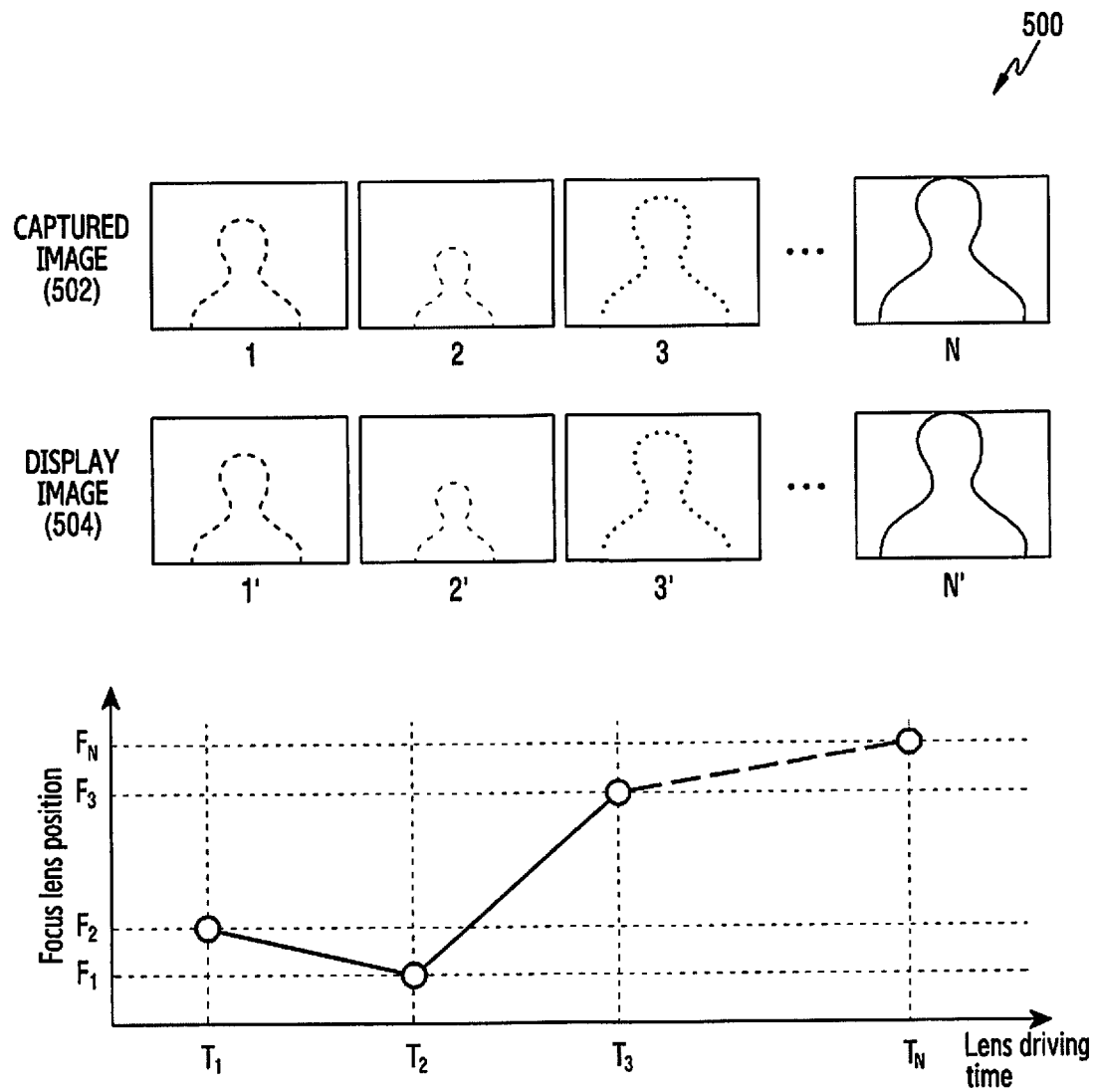
FIG. 5A is a diagram illustrating an auto focusing function of a common electronic device.
Figure 5B:
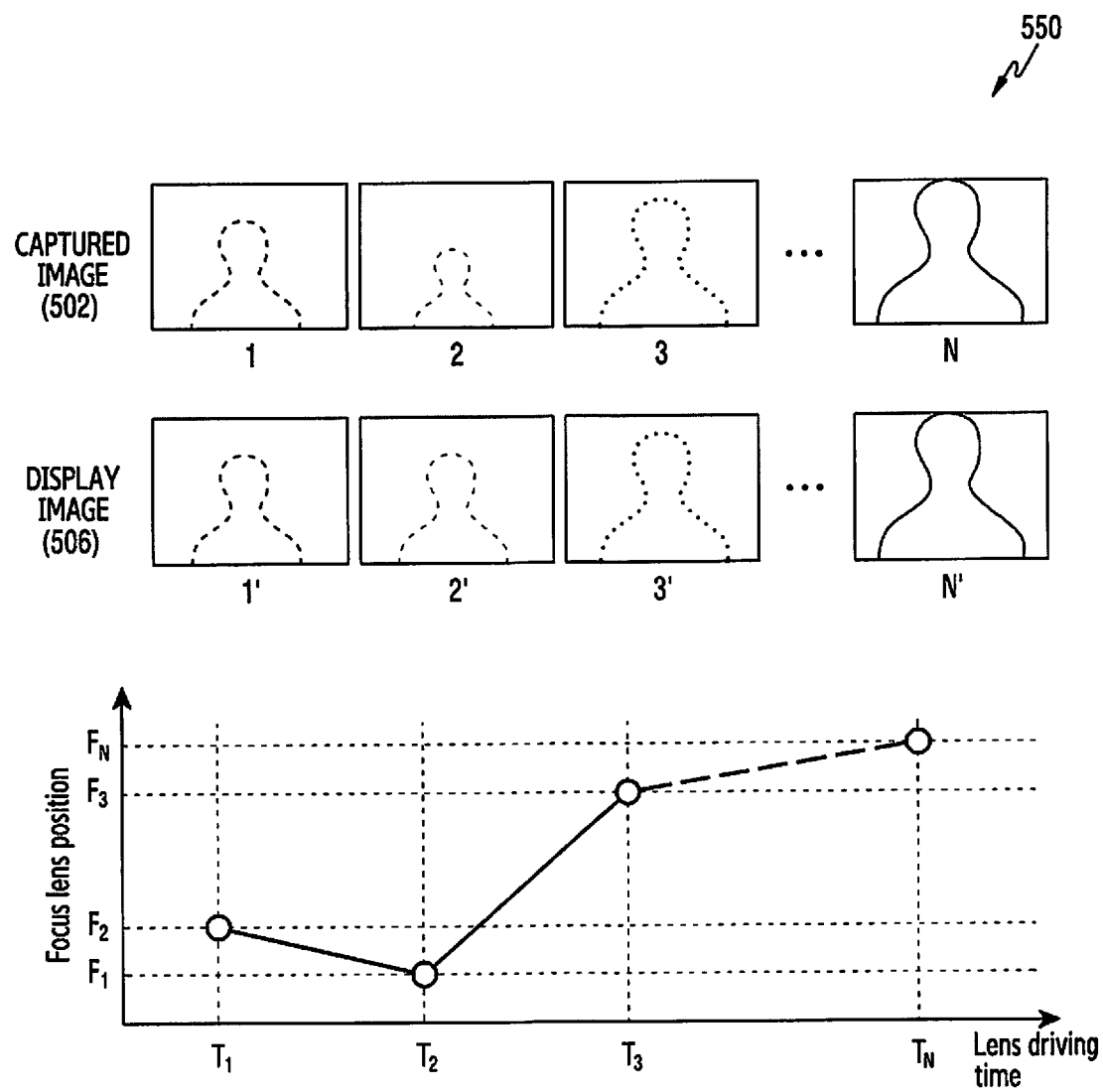
FIG. 5B is a diagram illustrating an auto focusing operation of an electronic device, according to an embodiment.

FIG. 5A is a diagram illustrating the auto focusing function of a common electronic device. FIG. 5B is a diagram illustrating the auto focusing function of an electronic device, according to an embodiment.

Referring a diagram 500 of FIG. 5A, a common electronic device can provide an auto focusing function that adjusts a focus on an object by moving a camera included in a camera module back and forth. The electronic device outputs an image 502 obtained through a camera module through the display in a preview image or a live view type 504 while an auto focusing function is performed. For example, as shown in FIG. 5A, when the focus lens is moved to a second lens position while a first image obtained at a first lens position is output, the electronic device 102 can update the screen using a second image obtained at the second lens position. As shown in FIG. 5A, when the focus lens 310 is moved to the second lens position opposite to the first lens position, and then moved to a third lens position opposite to the second lens position, the electronic device 102 outputs the second image with screen magnification reduced in comparison to the first image, and then outputs a third image of which the screen magnification has been increased in comparison to the second image, so wobbling in which an output image is shaken, may occur.

Referring to a diagram 550 of FIG. 5B, the electronic device 102, according to an embodiment of the disclosure, can prevent wobbling by controlling output of an image while an auto focusing function is performed. Specifically, the electronic device 102 can limit output of a second image and can keep outputting a first image at least while a defocus amount is calculated. For example, when the focus lens 310 is moved to a second lens position opposite to a first lens position, and then moves to a third lens position opposite to the second lens position, the electronic device 102 outputs a first image and then outputs a third image (as shown in 506), whereby a user can recognize a linear increase or decrease of the image magnification.

Figure 6:
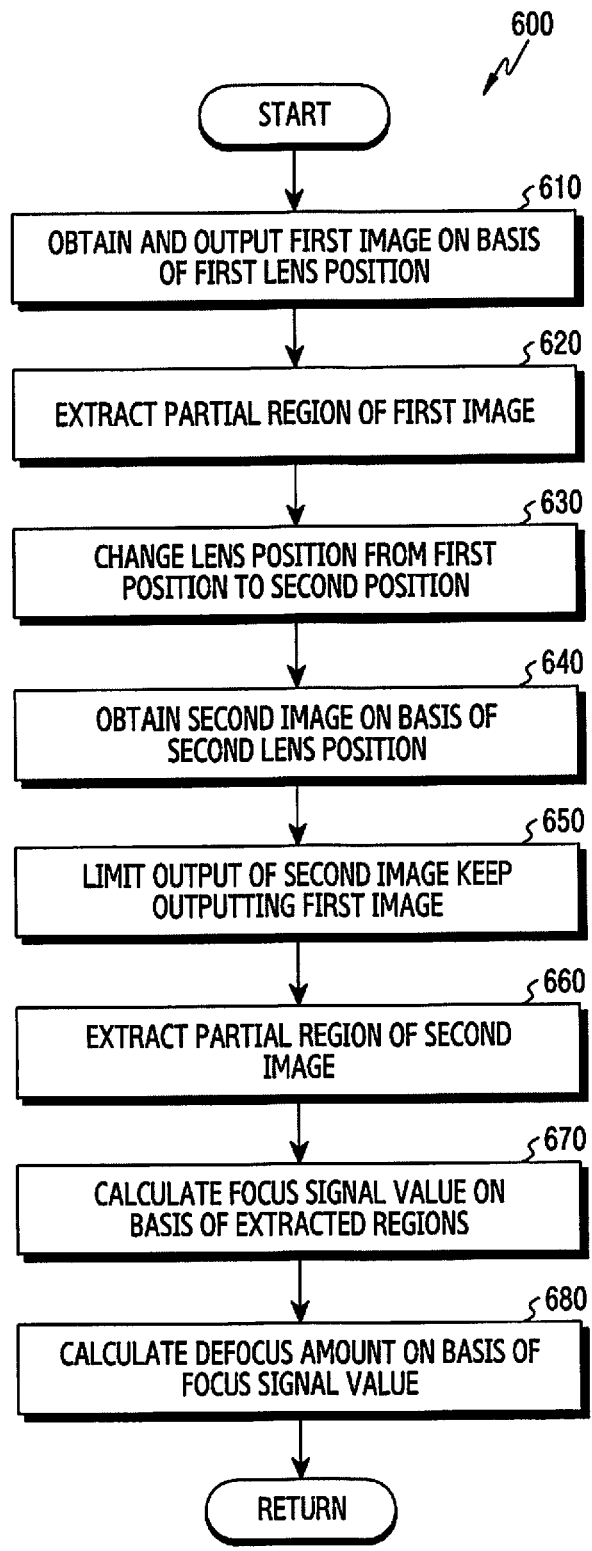
FIG. 6 is a flowchart illustrating a method for calculating a defocus amount in an electronic device, according to an embodiment.

FIG. 6 is a flowchart illustrating a method for calculating a defocus amount in an electronic device, according to an embodiment. The operations of FIG. 6 may be various embodiments of operation 410 and operation 430 of FIG. 4. Further, the operations described below may be sequentially performed, but are not necessarily sequentially performed. For example, the order of the operations may be changed and at least two operations may be performed in parallel.

Referring to a flowchart 600 of FIG. 6, the electronic device 300 obtains and outputs a first image based on a first lens position, in operation 610. The processor can obtain a first image of an object by sensing light of the object that has traveled inside through a focus lens (e.g., the focus lens 310 of FIG. 3) at the first position.

The electronic device 300 extracts a partial region of the obtained first image, in operation 620. According to an embodiment, the partial region of the first image may be a part that is used to detect focus. The processor 120 can use the center portion of the first image to detect a focus. However, this is only an example and embodiments are not limited thereto. The processor 120 may use various portions of the first image, such as, for example, a corner of the first image or an edge detected from the first image, to detect a focus. According to an embodiment, the processor 120 may store the obtained first image or a partial region of the first image inside or outside the electronic device 300 (e.g., the external electronic devices 102 and 104 or the server 108 of FIG. 1).

The electronic device 300 changes the focus lens 310 at the first position to the second position, in operation 630. The second position to which the focus lens 310 is moved may be determined by an algorithm determined in advance.

The electronic device 300 obtains a second image based on the second lens position, in operation 640. The processor 120 can obtain a second image of an object by sensing light of the object that has traveled inside through the focus lens 310 that has been moved to the second position from the first position.

The electronic device 300 obtains limit output of the second image and outputs the first image, in operation 650. The processor 120 can prevent the second image from being output with the image magnification increased or decreased in comparison to the first image due to a change of the movement direction of the focus lens 310.

The electronic device 300 extracts a partial region of the obtained second image, in operation 660. The partial region of the second image may be a part that is used to detect focus. The processor 120 can use the center portion of the second image to detect a focus. However, this is only an example and embodiments are not limited thereto. The processor 120 may use various portions of the second image, such as, for example, a corner of the second image or an edge detected from the second image, to detect a focus. The processor 120 may store the obtained second image or a partial region of the second image inside or outside the electronic device 300 (e.g., the external electronic devices 102 and 104 or the server 108 of FIG. 1).

The electronic device 300 measures a focus signal value based on the extracted regions, in operation 670. The processor 120 can measure a focus signal value such as blur between image, a contrast, and a phase difference by performing frequency analysis on the first image (or a partial region of the first image) and the second image (or a partial region of the second image), as described above with reference to FIG. 3.

The electronic device 300 calculates a defocus amount of the focus lens 310 based on the calculated focus signal value, in operation 680. The processor 120 can store a defocus amount defined in advance for defocus amounts corresponding to various focus signal values. In this case, the processor 120 can calculate the current defocus amount of the focus lens 310 by comparing the calculated focus signal value with the reference defocus amount. The processor 120 can determine a search position based on a calculated defocus amount, as described above with reference to FIG. 3. When the focus lens 310 departs from the on-focus region over a reference range, the processor 120 can determine a position spaced apart from the current position of the focus lens 310 by a first distance toward the focus region as a search position. When the focus lens 310 does not depart from the on-focus region over the reference range, the processor 120 can determine a position spaced apart from the current position of the focus lens 310 by a second distance shorter than the first distance toward the focus region as a search position.

Figure 7:
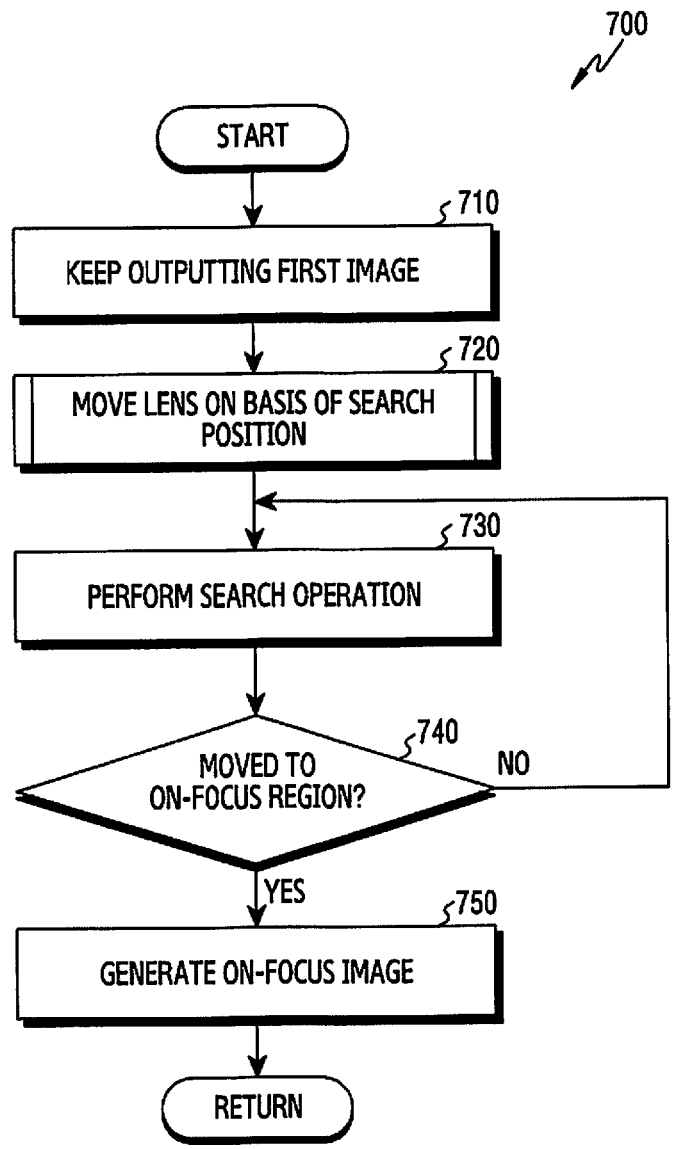
FIG. 7 is a flowchart illustrating a method for defecting an on-focus region in an electronic device, according to an embodiment.
Figure 8:
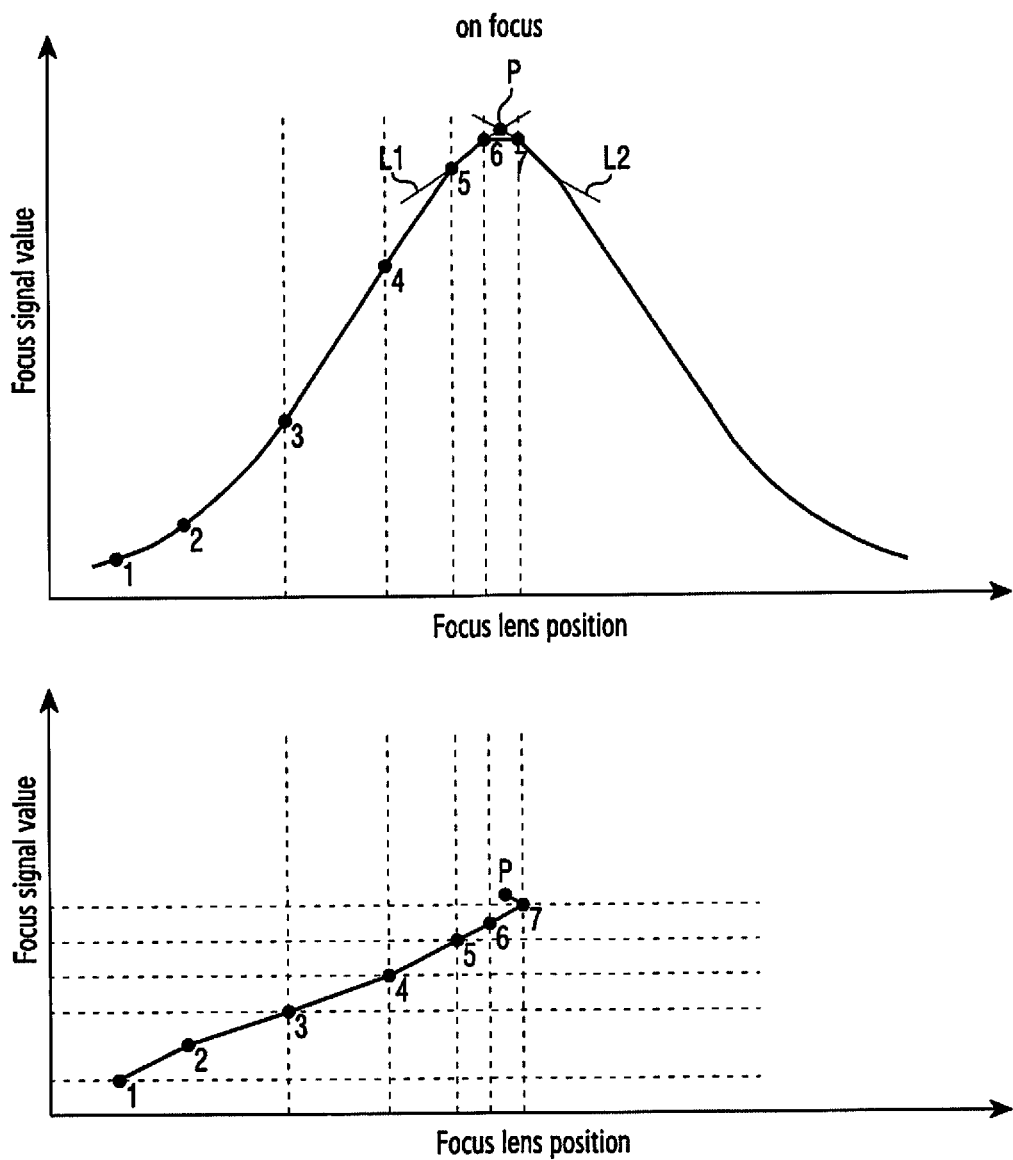
FIG. 8 is a diagram illustrating the operation of defecting an on-focus region in an electronic device, according to an embodiment.

FIG. 7 is a flowchart illustrating a method for defecting an on-focus region in an electronic device, according to an embodiment of the disclosure. FIG. 8 is a diagram illustrating the operation of defecting an on-focus region in an electronic device, according to an embodiment of the disclosure. The operations of FIG. 7 may be various embodiments of operation 440 of FIG. 4. Further, the operations described below may be sequentially performed, but are not necessarily sequentially performed. For example, the order of the operations may be changed and at least two operations may be performed in parallel.

Referring to a flowchart of FIG. 7, the electronic device 300 keeps outputting the first image, in operation 710. The first image may be an image obtained at the previous position of a focus lens (e.g., the focus lens 310 of FIG. 3). The processor 120 can output the first image obtained at the previous position of the focus lens 310 instead of a second image even if the second image is obtained based on a second lens position.

The electronic device 300 moves the focus lens 310 based on a search position, in operation 720.

The electronic device 300 performs a search operation using the focus lens 310 moved to the search position, in operation 730. The processor 120 can measure a focus signal value (e.g., a contrast value) of an image that is obtained through the focus lens 310 moved to the search position. Further, the processor 120 can obtain an image while moving the focus lens 310, step by step, to an on-focus lens, and can measure a focus signal value of the obtained image.

The electronic device 300 determines whether the focus lens 310 has approached the on-focus region, in operation 740. For example, the processor 120 can determine that the focus lens 310 has approached the on-focus region when a focus signal value of the image obtained at the position to which the focus lens 310 has been moved is measured as a maximum focus signal value. The processor 120 can calculate the ratio of the focus signal value (e.g., a second focus signal value) for the current position of the focus lens 310 to the focus signal value (e.g., a first focus signal value) for the previous position of the focus lens 310 (e.g., second focus signal value/first focus signal value). Further, the processor 120 can determine that the focus lens 310 has approached the on-focus region at the point in time when the ratio of focus signal values increases and then decreases or the ratio of focus signal values decreases and then increases, as the focus lens 310 is moved.

When it is determined that the focus lens 310 has not approached the on-focus region, that is, when the ratio of focus signal values continuously increases or decreases as the focus lens 310 is moved, the electronic device 300 repeats the search operation by returning to operation 730. For example, the processor 120, as stated with reference to operation 730, obtains an image while moving the focus lens 310, step by step, to an on-focus lens, and can measure a focus signal value of the obtained image.

When it is determined that the focus lens 310 has approached the on-focus region, that is, when the ration of focus signal values increases and then decreases or decreases and then increases as the focus lens 310 is moved, the electronic device 300 (e.g., the processor 120 of FIG. 3) generates an on-focus image, in operation 750. The on-focus image may be an image focused on an object through the focus lens 310 positioned in the on-focus region. For example, the processor 120 can detect an on-focus position and can move the focus lens 310 to the detected on-focus position to generate an on-focus image.

For example, the processor 120, as shown in FIG. 8, can detect an on-focus position using three-point interpolation. Specifically, the processor 120 can calculate a focus signal value for each position while moving the focus lens 310 step by step. For example, the processor 120 can calculate a focus signal value while moving from a first position to a seventh position. Further, the processor 120 can determine that an on-focus region is approached at a point where the focus lens 320 is moved from the sixth position to the seventh position. The processor 120 can determine that the point P where a line L1 connecting the focus signal values at the fifth position and the sixth position and a tangential line L2 of the focus signal value at the seventh position meet each other as an on-focus point, and can finally move the focus lens 310 to the point P. However, this is only an example and embodiments are not limited thereto. The processor 120 may determine an on-focus point based on various methods known in the art. The processor 120 can output a generated on-focus image as a preview image or a live view. However, this is only an example and embodiments are not limited thereto. For example, the processor 120 may store the on-focus image inside or outside the electronic device 300 (e.g., in the external electronic devices 102 and 104 or the server 108 of FIG. 1).

Figure 9:
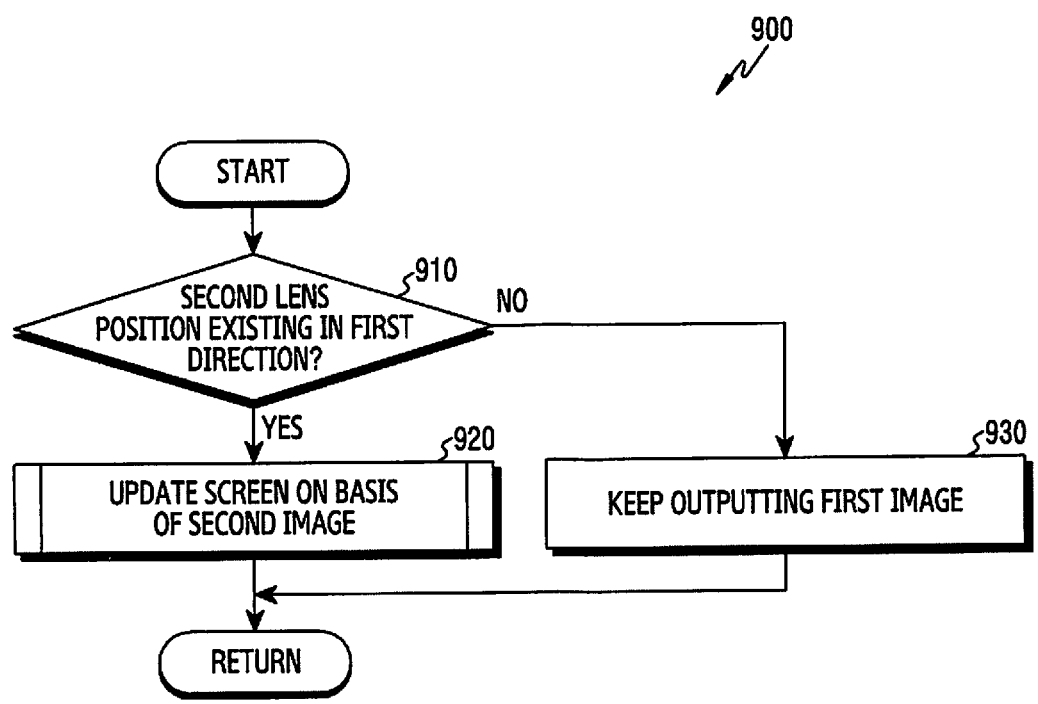
FIG. 9 is a flowchart illustrating a method for moving a focus lens based on a search position in an electronic device, according to an embodiment.

FIG. 9 is a flowchart illustrating a method for moving a focusing lens based on a search position in an electronic device, according to an embodiment. The operations of FIG. 9 may be various embodiments of operation 720 of FIG. 7. Further, the operations described below may be sequentially performed, but are not necessarily sequentially performed. For example, the order of the operations may be changed and at least two operations may be performed in parallel.

Referring to a flowchart 900 of FIG. 9, the electronic device 300 determines whether the second lens position exists in the first direction with respect to the first lens position, or whether the second lens position exists in the second direction with respect to the first lens position, in operation 910. For example, the first lens position may be a position where a first image for calculating a defocus amount is obtained and the second lens position may be a position where a second image for calculating a defocus amount is obtained. Further, the first direction may be a direction coming closer to the on-focus region than the first lens position and the second direction may be a direction going away from the on-focus position more than the first lens position.

When it is determined that the second lens position exists in the first direction, the electronic device 300 updates the screen based on the second image previously obtained, in operation 920. The processor 120 can process the second image is displayed on the screen until a focus lens (e.g., the focus lens 310 of FIG. 3) is moved to a search position. For example, as will be described in detail below with reference to FIGS. 10A to 10C, the processor 120 can decrease the magnification of an image that a user actually perceives when outputting a third image by temporarily outputting the second image after outputting the first image.

When it is determined that the second lens position exists in the second direction, the electronic device 300 keeps outputting the first image, in operation 930. The processor 120 can keep outputting the first image until the focus lens 310 is moved to the search position.

Figure 10A:
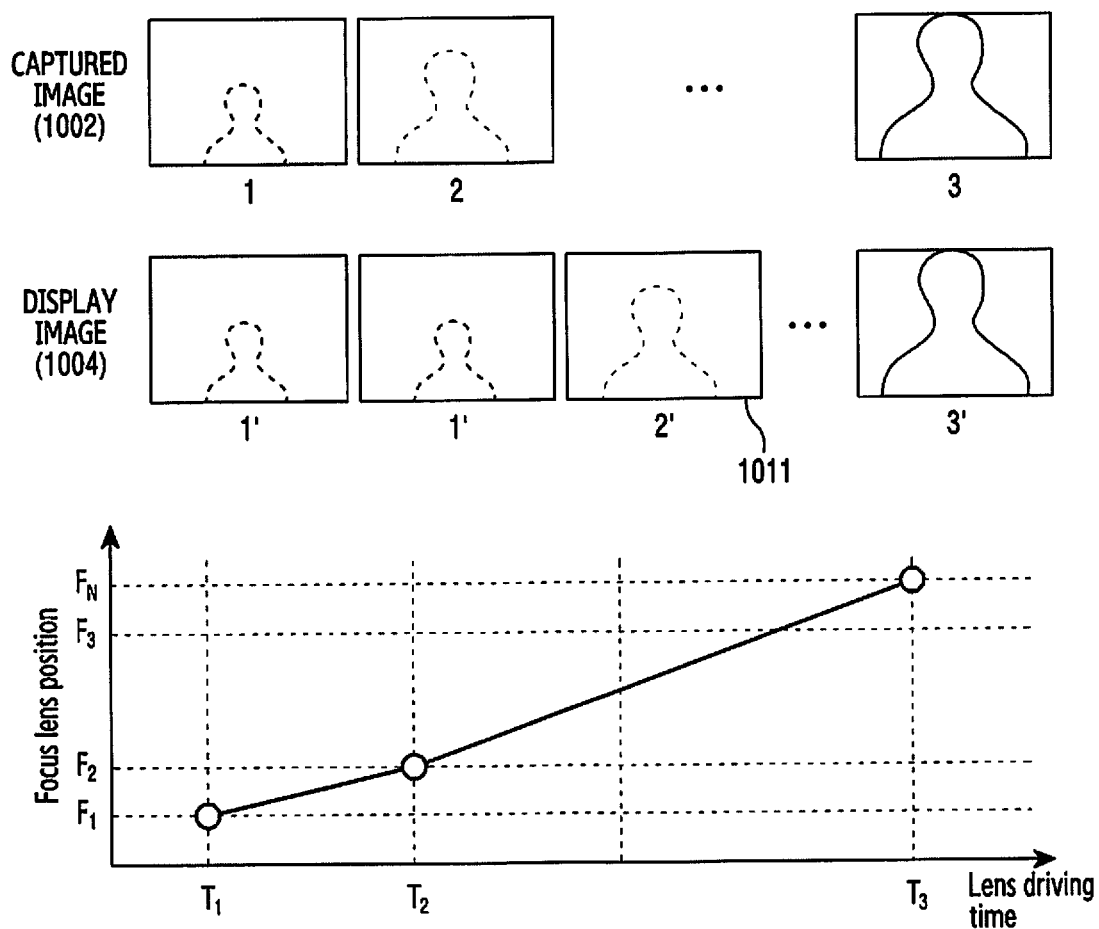
FIG. 10A is a diagram illustrating the operation of moving a focus lens based on a search position in an electronic device, according to an embodiment.
Figure 10B:
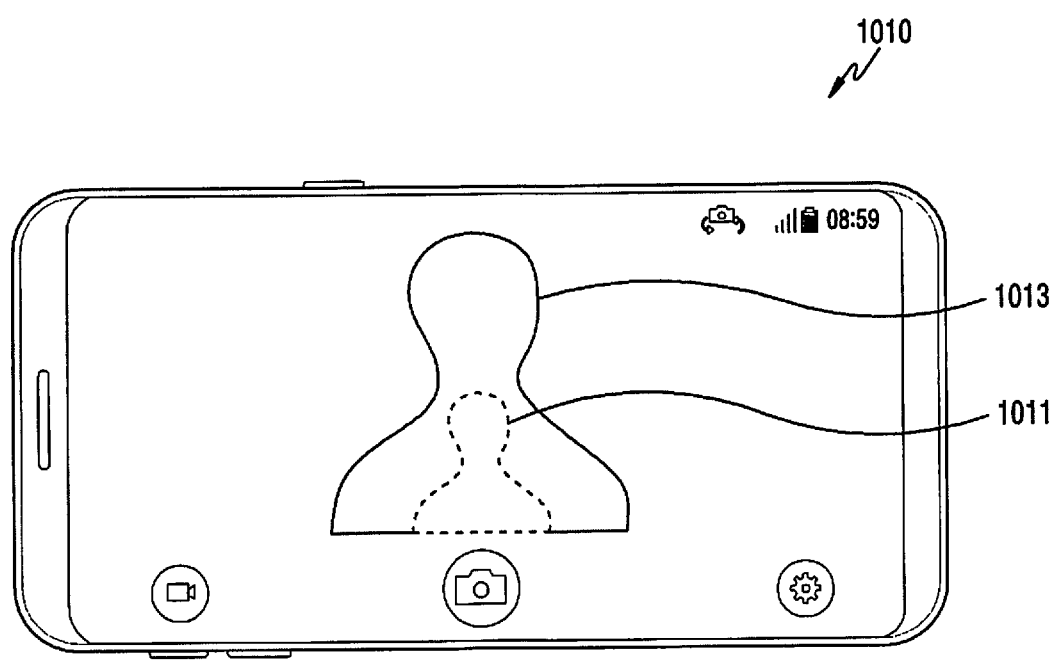
FIG. 10B is a diagram illustrating the operation of moving a focus lens based on a search position in an electronic device, according to an embodiment.
Figure 10C:
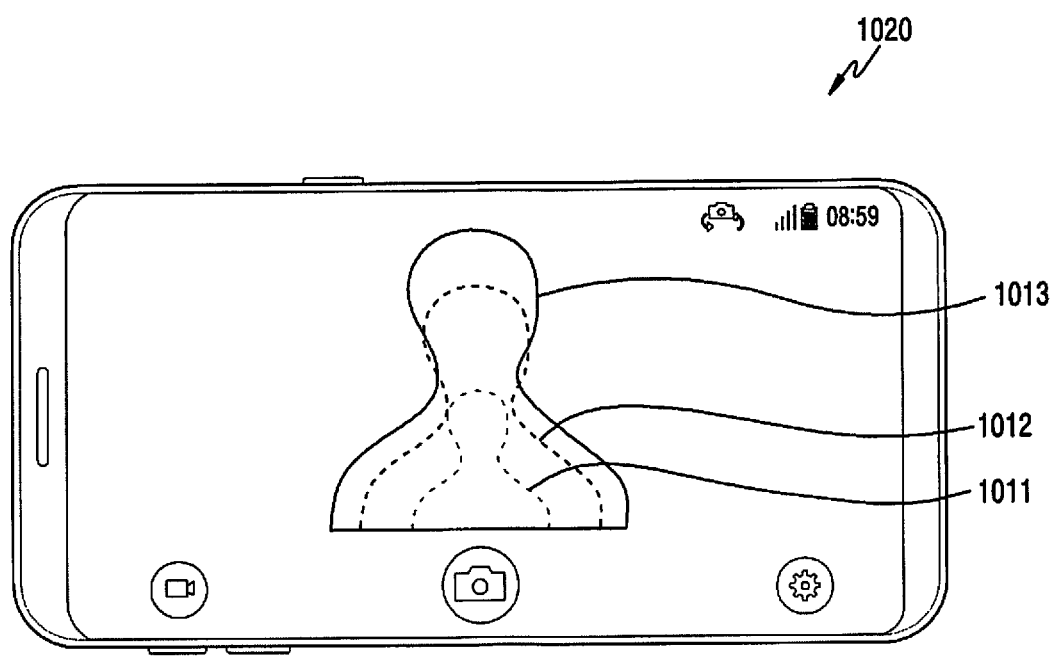
FIG. 10C is a diagram illustrating the operation of moving a focus lens based on a search position in an electronic device, according to an embodiment.

FIG. 10A is a diagram illustrating the operation of moving a focusing lens based on a search position in an electronic device, according to an embodiment of the disclosure. FIG. 10B is a diagram illustrating the operation of moving a focusing lens based on a search position in an electronic device, according to an embodiment of the disclosure. FIG. 10C is a diagram illustrating the operation of moving a focusing lens based on a search position in an electronic device, according to an embodiment of the disclosure.

Referring to FIG. 10A, as described above, the electronic device 300 can calculate a defocus amount based on a first image obtained based on the first lens position and a second image 1002 obtained based on the second lens position. The electronic device 300 can prevent wobbling by limiting output of the second image and outputting only the first image while a defocus amount is calculated (as shown by 1004). The electronic device 300 can perform an operation that detects an on-focus region by moving the focus lens 310 to the third lens position based on the defocus amount.

The electronic device 300 can control the second image to be output while moving the focus lens 310 to the third position. As shown in FIG. 10A, images of which the image magnification linearly increases may be obtained due to movement of the focus lens 310, but the electronic device 300 outputs the first image instead of the second image and then outputs the second image 1002 while the focus lens 310 is moved to the third lens position (or before the third image is output) in order to prevent wobbling, thereby being able to decrease a change in magnification of images that a user actually perceives.

As shown in a diagram 1010 of FIG. 10B, when a first image 1011 keeps being output until a third image 1013 is output, the change in magnification of an image that a user actually perceives may increase. In contrast, as shown in a diagram 1020 of FIG. 10C, when the second image 1012 is temporarily output before the third image 1013 is output, it is possible to decrease a change in magnification of an image that a user actually perceives in comparison to the situation shown in FIG. 10B.

Figure 11:
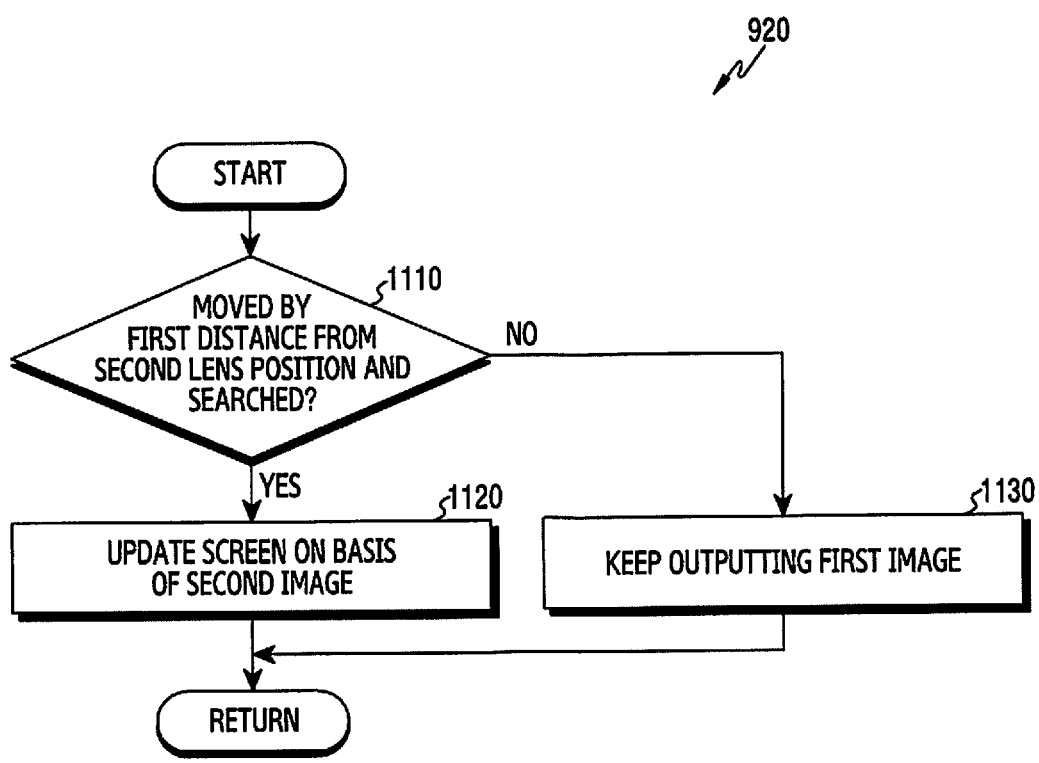
FIG. 11 is a flowchart illustrating a method for updating a screen based on a second image in an electronic device, according to an embodiment.

FIG. 11 is a flowchart illustrating a method for updating a picture based on a second image in an electronic device, according to an embodiment of the disclosure. The operations of FIG. 11 are detailed description of operation 920 of FIG. 9. Further, the operations described below may be sequentially performed, but are not necessarily sequentially performed. For example, the order of the operations may be changed and at least two operations may be performed in parallel.

Referring to a flowchart 1100 of FIG. 11, the electronic device 300 determines whether a focus lens (the focus lens 310 of FIG. 3) is spaced a predetermined reference distance from the second lens position and a search operation is performed, in operation 1110. The reference distance may be a value for determining a situation in which a user can actually feel a change in magnification of an image.

When a search operation is performed with the focus lens spaced by the reference distance, that is, when it is a situation in which a user can actually perceive a change in magnification of an image, the electronic device 300 updates the screen based on the second image, in operation 1120. The processor 120 can process the second image to be displayed on the screen until the focus lens 310 is moved to the search position.

When a search operation is performed without the focus lens spaced by the reference distance, that is, when it is a situation in which a user cannot actually perceive a change in magnification of an image, the electronic device 300 keeps outputting the first image, in operation 1130. According to an embodiment, the processor 120 can keep outputting the first image until the focus lens 310 is moved to the search position.

According to an embodiment, a method is provided for operating an electronic device and includes obtaining a first image at a first position of a focus lens of a camera module of the electronic device, outputting the first image through a display of the electronic device, obtaining a second image at a second position of the focus lens while the first image is being output, calculating a defocus amount of the focus lens at the second position based on the first image and the second image, and detecting an on-focus region based on the calculated defocus amount.

Calculating the defocus amount includes limiting an output of the second image while the first image is being output.

Detecting the on-focus region includes obtaining a third image at a third position of the focus lens and replacing the first image with the third image.

Detecting the on-focus region includes outputting the second image before the first image is replaced with the third image.

Detecting the on-focus region includes outputting the second image before the first image is replaced with the third image when the second position is in a first direction in proximity to the on-focus region with respect to the first position.

Detecting the on-focus region includes outputting the second image before the first image is replaced with the third image when the focus lens is moved over a reference distance from the second position in the first direction.

Detecting the on-focus region includes continuing to output the first image before the first image is replaced with the third image when the focus lens is moved less than a reference distance from the second position in the first direction.

Detecting the on-focus region includes continuing to output the first image before the first image is replaced with the third image when the second position exists in a second direction that moves away from the on-focus region with respect to the first position.

Detecting the on-focus region includes calculating a contrast of the third image.

Calculating the defocus amount includes calculating a blur between the first image and the second image.

According to various embodiments, a computer-readable recording medium may include programs for performing obtaining a first image at a first position of a focus lens, outputting a first image through a display, obtaining a second image at a second position of the focus lens while the first image is output, calculating a defocus amount of the focus lens at the second position on the basis of the first image and the second image, and detecting an on-focus region on the basis of the calculated defocus amount.

The electronic device according to various embodiments may be one of various types of electronic devices. The electronic devices may include a portable communication device (e.g., a smartphone), a computer device, a portable multimedia device, a portable medical device, a camera, a wearable device, or a home appliance. However, the electronic devices are not limited to those described above.

Various embodiments of the disclosure and the terms used therein are not intended to limit the technological features set forth herein to particular embodiments and include various changes, equivalents, or replacements for a corresponding embodiment.

A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively," as "coupled with," "coupled to," "connected with," or "connected to" another element (e.g., a second element), it means that the element may be coupled with the other element directly (e.g., wiredly), wirelessly, or via a third element.

Herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, a module may be implemented in a form of an application-specific integrated circuit (ASIC).

Various embodiments, as set forth herein, may be implemented as software (e.g., the program 140 of FIG. 1) including one or more instructions that are stored in a storage medium (e.g., internal memory 136 or external memory 138 of FIG. 1) that is readable by a machine (e.g., the electronic device 101 of FIG. 1). For example, a processor (e.g., the processor 120 of FIG. 1) of the machine (e.g., the electronic device 101 of FIG. 1) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
a camera module including a focus lens;
a display; and
a processor,
wherein the processor is configured to:
control the camera module to obtain a first image at a first position of the focus lens;
control the display to output the first image;
control the camera module to obtain a second image at a second position of the focus lens while the first image is being output;
calculate a defocus amount of the focus lens at the second position based on the first image and the second image, wherein the output of the first image is maintained at least until the defocus amount is calculated;
detect an on-focus region based on the calculated defocus amount;
determine a movement direction of the focus lens with respect to the on-focus region;
control the camera module to obtain a third image at a third position of the focus lens, wherein the focus lens is moved to the third position based on the determined movement direction; and
control the display to output the third image,
wherein whether to maintain the output of the first image after the calculation of the defocus amount is determined based on the movement direction of the focus lens.

2. The electronic device of claim 1, wherein the processor is further configured to:
control the display to replace the first image with the third image based on the defocus amount.

3. The electronic device of claim 2, wherein the processor is further configured to control the display to output the second image before the first image is replaced with the third image.

4. The electronic device of claim 3, wherein, when the second position is in a first direction in proximity to the on-focus region with respect to the first position, the processor is further configured to control the display to output the second image before the first image is replaced with the third image.

5. The electronic device of claim 4, wherein, when the focus lens is moved over a reference distance from the second position in the first direction, the processor is further configured to control the display to output the second image before the first image is replaced with the third image.

6. The electronic device of claim 5, wherein, when the focus lens is moved less than the reference distance from the second position in the first direction, the processor is further configured to control the display to continue outputting the first image before the first image is replaced with the third image.

7. The electronic device of claim 3, wherein, when the second position is in a second direction that moves away from the on-focus region with respect to the first position, the processor is further configured to control the display to continue outputting the first image before the first image is replaced with the third image.

8. The electronic device of claim 2, wherein the processor is further configured to detect the on-focus region based on a contrast of the third image.

9. The electronic device of claim 1, wherein the processor is further configured to calculate the defocus amount based on a blur between the first image and the second image.

10. A method of operating an electronic device, the method comprising:
   obtaining a first image at a first position of a focus lens of a camera module of the electronic device;
   outputting the first image through a display of the electronic device;
   obtaining a second image at a second position of the focus lens while the first image is being output;
   calculating a defocus amount of the focus lens at the second position based on the first image and the second image, wherein the outputting of the first image is maintained at least until the defocus amount is calculated;
   detecting an on-focus region based on the calculated defocus amount;
   determining a movement direction of the focus lens with respect to the on-focus region;
   obtaining a third image at a third position of the focus lens, wherein the focus lens is moved to the third position based on the determined movement direction; and
   outputting the third image though the display,
   wherein whether to maintain the outputting of the first image after the calculating of the defocus amount is determined based on the movement direction of the focus lens.

11. The method of claim 10, wherein detecting the on-focus region comprises:
   replacing the first image with the third image.

12. The method of claim 11, wherein detecting the on-focus region further comprises outputting the second image before the first image is replaced with the third image.

13. The method of claim 12, wherein detecting the on-focus region comprises outputting the second image before the first image is replaced with the third image when the second position is in a first direction that is in proximity to the on-focus region with respect to the first position.

14. The method of claim 13, wherein detecting the on-focus region comprises outputting the second image before the first image is replaced with the third image when the focus lens is moved over a reference distance from the second position in the first direction.

15. The method of claim 14, wherein detecting the on-focus region comprises continuing to output the first image before the first image is replaced with the third image when the focus lens is moved less than the reference distance from the second position in the first direction.

16. The method of claim 12, wherein detecting the on-focus region comprises continuing to output the first image before the first image is replaced with the third image when the second position exists in a second direction that moves away from the on-focus region with respect to the first position.

17. The method of claim 11, wherein detecting the on-focus region comprises calculating a contrast of the third image.

18. The method of claim 10, wherein calculating the defocus amount comprises calculating a blur between the first image and the second image.

* * * * *